US010712057B2

(12) United States Patent
Samkhan

(10) Patent No.: US 10,712,057 B2
(45) Date of Patent: Jul. 14, 2020

(54) METHOD AND DEVICE FOR GENERATION OF ELECTRIC POWER AND COLD USING LOW-POTENTIAL HEAT SOURCES

(71) Applicant: Waste to Energy Generating Inc., Toronto (CA)

(72) Inventor: Igor I. Samkhan, Yaroslavl (RU)

(73) Assignee: Waste to Energy Generating Inc., Toronto, Ontario (CA)

( * ) Notice: Subject to any disclaimer, the term of this patent is extended or adjusted under 35 U.S.C. 154(b) by 192 days.

(21) Appl. No.: 15/780,531

(22) PCT Filed: Apr. 21, 2016

(86) PCT No.: PCT/RU2016/000231
§ 371 (c)(1),
(2) Date: May 31, 2018

(87) PCT Pub. No.: WO2017/116276
PCT Pub. Date: Jul. 6, 2017

(65) Prior Publication Data
US 2018/0363957 A1  Dec. 20, 2018

(30) Foreign Application Priority Data

Dec. 29, 2015  (RU) ................. 2015156984

(51) Int. Cl.
*F25B 29/00* (2006.01)
*F25B 15/04* (2006.01)
(Continued)

(52) U.S. Cl.
CPC ............. *F25B 29/006* (2013.01); *F01K 1/00* (2013.01); *F01K 25/065* (2013.01); *F01K 25/10* (2013.01);
(Continued)

(58) Field of Classification Search
CPC ........ F25B 29/006; F25B 30/06; F25B 29/00; F25B 15/04; F25B 2400/14;
(Continued)

(56) References Cited

U.S. PATENT DOCUMENTS 4,691,522 A * 9/1987 Brown, II ................. F01K 5/00
60/641.8
4,729,226 A * 3/1988 Rosado .................... F01K 25/06
60/649
(Continued)

FOREIGN PATENT DOCUMENTS

| CN | 102878603 | 1/2013 |
| CN | 103161528 | 6/2013 |
| RU | 2529917 | 10/2014 |

OTHER PUBLICATIONS

G.V. Belov, M.A. Dorokhova. Organic Rankine Cycle and its Application in Alternative Energetics. Russia, Bauman Moscow State Technical University, No. 2, 2014; pp. 99-124.
(Continued)

*Primary Examiner* — Hoang M Nguyen
(74) *Attorney, Agent, or Firm* — David E. Crawford; Crawford IP Law

(57) ABSTRACT

A method for generating electricity and cold and a device for realizing same, consists in a closed absorption cycle in which a working body is a mixture of a low-boiling (refrigerant) component and a high-boiling (absorbent) component. The method involves evaporating a strong solution in a steam generator, thus forming a refrigerant vapor and a weak solution, expanding the refrigerant vapor in a turbine, thus producing work, and, after the turbine, absorbing spent vapor in an absorber, forming a strong solution. A distinguishing feature of the method consists in changing the concentration of a strong solution using two stages, including not only evaporation but also filtration. The proposed
(Continued)

method and device allow for significantly increasing the efficiency of systems for generating electricity relative to analogous known methods.

15 Claims, 1 Drawing Sheet

(51) Int. Cl.
F01K 25/06 (2006.01)
F01K 25/10 (2006.01)
F25B 30/06 (2006.01)
F01K 1/00 (2006.01)

(52) U.S. Cl.
CPC .............. F25B 15/04 (2013.01); F25B 29/00 (2013.01); F25B 30/06 (2013.01); F25B 2315/005 (2013.01); F25B 2400/02 (2013.01); F25B 2400/0411 (2013.01); F25B 2400/14 (2013.01); Y02A 30/277 (2018.01); Y02B 30/62 (2013.01)

(58) Field of Classification Search
CPC ........ F25B 2315/005; F25B 2400/0411; F01K 1/00; F01K 25/065; F01K 25/10; Y02B 30/62; Y02A 30/277
USPC .................................... 60/649, 651, 671, 673
See application file for complete search history.

(56) References Cited

U.S. PATENT DOCUMENTS

| 4,918,937 | A | * | 4/1990 | Fineblum | F25B 1/00 62/175 |
| 5,237,839 | A | * | 8/1993 | Dehne | F25B 15/04 62/476 |
| 5,953,918 | A | | 9/1999 | Kalina et al. | |
| 7,350,372 | B2 | | 4/2008 | Wells | |
| 8,464,531 | B2 | | 6/2013 | Samkhan | |
| 2005/0086971 | A1 | * | 4/2005 | Wells | F25B 15/02 62/324.2 |
| 2013/0038055 | A1 | * | 2/2013 | Ostrom | F01K 25/065 290/2 |

OTHER PUBLICATIONS

V.L. Kudryashov, I.I. Burachevsky, V.P. Dubyaga et al. Modern Domestic Competitive Reverse—Osmosis, Nano Filtration and Microfiltration Membrane Elements, Plants and Technologies for Liquor and Alcohol Industries, Series. Critical Technologies. Membranes, 2004, No. 3 (23), p. 24.

N.V. Churaev. Physicochemistry of Mass Transfer Processes in Porous Bodies. Moscow: Khimiya (Chemistry), 1990, p. 98, абза ц 2.

JSC Membranines Technologijos LT Electrodialysis, Electrodialysis Device,Electrodialysis Unit, Electromembrane Device, Electrodialysis Plant, Bipolar Electrodialysis JSC.

Journal homepage: www.elsevier.com/locate/desalWater purification by shock electrodialysis: Deionization, filtration, separation, and disinfection.

Hindawi Publishing Corporation Advances in Mechanical Engineering vol. 2013, Article ID 620592, 7 pages http://dx.doi.org/10.1155/2013/620592 Overview of Ionic Liquids.

* cited by examiner

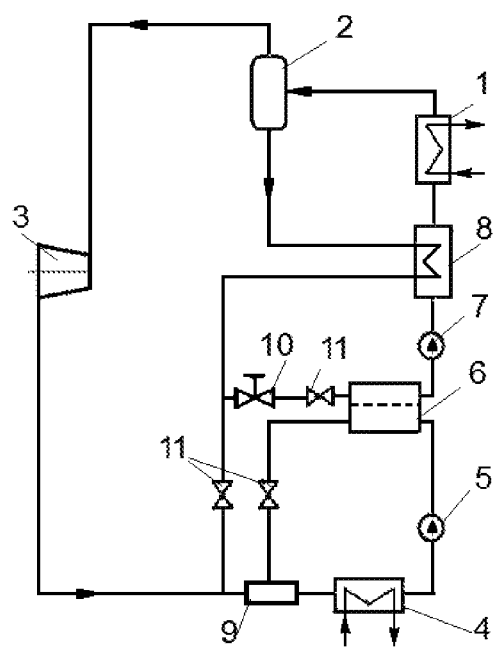

METHOD AND DEVICE FOR GENERATION OF ELECTRIC POWER AND COLD USING LOW-POTENTIAL HEAT SOURCES

This application is the United States national phase application of International Application PCT/RU2016/000231 filed Apr. 21, 2016, which claims the benefit of Russian Patent application No RU 20151566984 Filed Dec. 29, 2015, the entire disclosure of which is incorporated herein by reference.

BACKGROUND AND SUMMARY OF THE INVENTION

The invention relates to the heat and power engineering, in particular to the processes of producing mechanical or electric energy and cold by converting the thermal energy of relatively low temperature level.

At present, one of the well-known methods of producing mechanical and electrical energy from low potential thermal sources is the Organic Rankin Cycle also called the ORC cycle, in which low-boiling heat carriers are used as a working fluid [1].

Such a cycle involves the evaporation of the working fluid, at elevated pressure and temperature, the steam expansion in the turbine with the work being done, the condensation of exhaust steam, i.e. steam after the turbine, at a temperature higher than the temperature level of the environment, a rise in the pressure of the formed condensate of the working fluid with its further heating and evaporation.

In this cycle, the working fluid is a single-component substance with constant boiling and condensation temperatures, and in so doing the thermal energy released during the condensation is evacuated into the environment.

A disadvantage of the method is its comparatively low efficiency in terms of electric energy and the impossibility of producing cold.

Another known method of converting thermal energy into mechanical energy, or else into work, is the Kalina cycle [2]. In this cycle, the working fluid is a two-component mixture consisting of a low-boiling component as a refrigerant and a high-boiling component as an absorbent.

In this method the strong solution representing, as a rule, the ammonia-water mixture evaporates during the heating at an elevated temperature and an elevated pressure, separating therewith into a steam flow with an increased refrigerant content and a flow of a weak solution with a reduced cooling content of the refrigerant.

Thereupon the steam flow expands in the turbine to the temperatures higher than the temperature level of the environment, after which it mixes with the flow of the weak solution and condenses.

In so doing, the heat releasing during the condensation is removed into the environment as waste heat.

Besides, a method [3] for generating mechanical or electric energy and cold when using low-potential heat sources is known which has been chosen here as analogous one because it coincides in objective with the proposed invention and is closest to it for the totality of features prior art.

In this method, as distinct from the method [2], the steam formed during the evaporation of the strong solution expands in the turbine, with the work being done, to the temperatures lower than the temperature level of the environment.

The exhaust steam after the turbine, having a comparatively low temperature, is used for cooling external facilities, and then is absorbed by the weak solution to yield a strong solution. As this takes place, the heat releasing during the absorption is removed into the environment as waste heat.

A device for generating electric power and cold using low-potential heat sources [3] is well-known which incorporates flow circuits for the working medium circulation with a separator, a turbine with an electric generator, an absorber, a pump, an external cooler and a steam generator connected to an elevated-temperature heat source, being installed in them.

The object of the proposed invention is further to enhance the efficiency of the production of mechanical energy and cold by the use of renewable or secondary heat sources.

The specified goal is attained by that in the method for producing electric energy and cold using low-potential heat sources, involving circulation of the solution of refrigerant and absorbent in its periodic heating and cooling, evaporation of the high concentration solution in its heating with the formation of flows of the steam of the refrigerant and the weak solution of elevated temperature and pressure, expansion of the refrigerant steam flow in the turbine formed during evaporation with the formation at the turbine exit of the exhaust steam of reduced temperature and pressure, decrease in temperature and pressure of the weak solution, absorption of the exhaust steam by the weak solution under cooling with the formation of the strong solution, increase in pressure of the strong solution and feeding of the solution for evaporation, the strong solution is divided into the flows with reduced concentration of the refrigerant and the flows with increased concentration of the refrigerant, whereas the former of which are used as weak solution during absorption, while the latter after an additional increase in pressure and temperature are employed in the evaporation as strong solution with a high concentration of the refrigerant.

Furthermore, the characteristic features of the proposed method leading to the achievement of the technical result are:

separation of the strong solution into the flows with various concentration using a semipermeable membrane;

separation of the strong solution into the flows with various concentration using electro dialysis and shock electro dialysis;

the separation of the strong solution is carried out by applying the centrifugal and gravitational effects;

utilization of potential energy of the weak solution in the ejector in order to increase the pressure of the cooling agent during absorption;

heating of the high refrigerant concentration solution before its evaporation by the weak solution formed during evaporation;

employment for filtrating the strong solution of the membranes with the selectivity no more than 0.75;

mixing of the high concentration solution being formed during filtration and the weak solution which has been formed during evaporation;

application as absorbent of a mixture of the components differing in their permeability through a semipermeable membrane;

usage of the exhaust steam for cooling external facilities.

In the device for producing electric energy and cold, incorporating closed cycle of solution motion with an absorber, a pump, a solution heat exchanger, a steam generator and a separator connected in the solution motion cycle both to the steam generator and absorber, these machines being placed therein in series, and a turbine with an electric generator, connected at the inlet to the separator for delivering steam and to the absorber at the outlet from the turbine, filter elements have been additionally mounted which are connected on the one hand to the absorber for delivery to them of the strong solution and for return into the absorber of the weak solution, and on the other hand to the steam generator with the possibility of supply to it of a higher concentration solution passed by the filter elements.

Other distinguishing characteristics of the proposed device are connection of the separator to the filter elements with the possibility of delivery to them of the weak solution;

installation in the cycle between the steam generator and the filter elements of a supplementary pump and a recuperative solution heat exchanger;

installation between the turbine and the absorber of a vapor-liquid ejector;

use as filter elements of a membrane for nanofiltration;

installation of a control valve and an expansion throttle cock between the separator and the filter elements.

BRIEF DESCRIPTION OF THE DRAWINGS

The essence of the proposed method is illustrated with a schematic diagram of the plant for the production of electric energy and cold which is shown in FIG. 1.

DETAILED DESCRIPTION OF THE INVENTION

Such a device includes:

1—steam generator as boiler, 2—separator,

3—turbine with an electric generator also called heat engine,

4—absorber, 5—pump,

6—filter elements,

7—supplementary pump, 8—solution heat exchanger,

9—injector, 10—control valve,

11—expansion valves also called throttle valves.

The proposed method can be implemented as follows.

In the steam generator 1 the higher refrigerant concentration solution heats up, separating therewith into the flows of the refrigerant and weak solution steam.

From the generator 1 the flows of steam and weak solution enter the separator 2 where a more complete separation of vapor and liquid occurs.

Thereupon the steam flow is fed into the turbine 3 where it expands with the work being done. After the turbine the exhaust steam enters the absorber 4 either directly or with its preheating in the course of heat exchange with the external facilities under their cooling.

In its turn the weak solution flow emerging from the separator or from the steam generator is precooled in the recuperative solution heat exchanger 8 and, after reduction of its pressure in the expansion valve 11, also enters the absorber 4.

In the absorber 4 the exhaust steam is taken up by the weak solution with the formation of the strong solution. External heat-transfer agent removes the thermal energy released during the absorption.

Furthermore, the strong solution after the increase of its pressure by the pump 5 is divided by means of the semi-permeable membrane 6 also called filter elements into flows with various concentration of the refrigerant. One of these flows, which has not passed through the membrane, has a lower concentration of the refrigerant and after the reduction of its pressure in the expansion valve 11 or the injector 9 is used in the course of absorption as weak solution.

The other flow, which has passed through the filter elements, has a comparatively higher concentration of the refrigerant and is then delivered to the steam generator 1 where it is used during the evaporation as high concentration solution.

Before the steam generator, the pressure and temperature of the high concentration solution are preliminary increased by means of the pump 7 and the recuperative solution heat exchanger 8, respectively.

In this method, the possibility of delivery of the weak solution from the steam generator or separator not only to the absorption stage, but also to the filtration stage is provided for as well. In that case, the weak solution from the separator is delivered to the membrane from the side of the high refrigerant concentration solution allowed to pass by the membrane. In so doing both flows are mixed.

For regulating the delivery of the weak solution formed in the steam generator a control valve 10 serves in that event.

Such a technique allows in a number of instances to reduce the osmotic pressure difference of the solutions before and after the membrane.

Besides, to decrease the osmotic pressure of the strong solution to comparatively small values, approximately 5-10 bar, it is proposed in the method to employ mainly semipermeable membranes for nanofiltration or ultrafiltration, for example such as nanofiltration membranes of ESNA series characterized by a comparatively low operating pressure and selectivity about 60-80% or other similar membranes produced serially [4].

At the same time, in this case the reverse osmosis membranes can be also used because the osmotic pressure arising in this method may be regulated over wide limits by choosing the semipermeable membranes of comparatively low selectivity, e.g. 30-70% as shown in [5].

Moreover, a two-stage change in the strong solution concentration proposed in this method makes it desirable to employ also and the filtration methods of electrodialysis [6] and shock electrodialysis [7], what promotes a reduction of the overall dimensions of the system.

The proposed method can be implemented through the use of known working medias (solutions) considered in the absorption cycles of refrigerators and heat engines.

In particular, it makes sense to use as refrigerants the substances with a comparatively low boiling temperature, for example such as methanol, water, ammonia, R134a, R245fa, etc. as well as their mixtures.

As absorbents, it is worthwhile using the solvents having a comparatively high molecular weight, approximately more than 100 D, and a comparatively high normal boiling temperature, approximately more than 150° C. To such absorbents relate TEG (triethylene glycol), PEG-300 (polyethylene glycol), ionic liquids [8], TEG-DME (tetraethylene glycol dimethyl ether) and other known absorbent.

Some characteristic parameters of the proposed method with the use of the solution of methanol ($CH_3OH$) and ionic liquid [MMIm]DMP ($C_7H_{15}N_2O_4P$) are listed in Table 1.

This ionic liquid [MMIm]DMP has a molecular weight of 222.179 g/mole, registration number CAS-RN: 654058-04-5, and is recommended for the employment in modern absorption refrigerators [8].

TABLE 1

Some characteristic parameters of the proposed method

| Denomination of Parameter | Magnitude of parameter |
|---|---|
| Working medium | $CH_3OH$—[MMIm]DMP |
| Steam pressure before/after the turbine, bar | 2.96/0.028 |
| Steam temperature before/after the turbine, °C. | 100/minus 5 |
| Absorption temperature: initial/final, °C. | 22/33 |
| Filtration pressure, bar | 6 |
| Concentration of refrigerant in solution, wt. %: | |
| in absorber at the inlet/outlet | 16.7/25.2 |
| in steam generator at the inlet/outlet | 50.0/20 |
| Specific work of turbine or else enthalpy difference at inlet and outlet, kJ/kg | ~331.6 |
| Specific work of turbine with efficiency of 0.85, kJ/kg | 263.5 |
| Specific work consumed by pumps at efficiency of 0.75, kJ/kg | no more than 1.0 |
| Specific thermal load of steam generator, kJ/kg | ~1200 |
| Theoretical efficiency, % | 27.5 |
| Potential practical effectiveness, % | 21.9 |
| Theoretical efficiency of Carnot cycle, % | 19.8 |

The proposed method enables one significantly to improve the effectiveness of generation of electric power and cold as compared with other analogous methods.

In particular, the effectiveness of such cycles can exceed the maximum magnitude of this parameter allowable today in the corresponding Carnot cycles because in this case the rules of equilibrium thermodynamics are obeyed not strictly enough owing to thermodynamic peculiarities of non-equilibrium absorption systems.

REFERENCES

1. G. V. Belov, M. A. Dorokhova. Organic Rankine Cycle and its Application in Alternative Energetics. Russia, Bauman Moscow State Technical University, No. 2, 2014; pp. 99-124. http://technomag.bmstu.ru/doc/699165.html
2. A. Kalina, R. Pelletier. Method and Apparatus of Converting Heat to Useful Energy. U.S. Pat. No. 5,953,918. Nov. 21, 1999
3. I. I. Samkhan. Method and device for converting thermal energy into electricity, high-potential heat and cold. U.S. Pat. No. 8,464,531 B2, Pub. Jun. 18, 2013
4. V. L. Kudryashov, I. I. Burachevsky, V. P. Dubyaga et al. Modern Domestic Competitive Reverse-Osmosis, Nano Filtration and Microfiltration Membrane Elements, Plants and Technologies for Liquor and Alcohol Industries, Series. Critical Technologies. Membranes, 2004, No. 3 (23), pp. 158-178.
5. N. V. Churaev. Physicochemistry of Mass Transfer Processes in Porous Bodies. Moscow: Khimiya (Chemistry), 1990, p. 98.
6. Membrane technologies http://www.mtlt.lt
7. D. Deng, W. Aouad, W. Braff, S. Schlumpberger and other. Water purification by shock electrodialysis: Deionization, filtration, separation, and disinfection. Desalination 357, (2015) 77-83, journal homepage: www.elsevier.com/locate/desal
8. M. Khamooshi, K. Parham, and U. Atikol. Overview of Ionic Liquids Used as Working Fluids in Absorption Cycles. Hindawi Publishing Corporation, Advances in Mechanical Engineering. 2013; Article ID 620592: 1-7

The invention claimed is:

1. A method for producing electric energy and cold using low-potential heat sources, comprising
    circulation of a solution comprising a refrigerant as a low-boiling component and an absorbent as a high-boiling component, with periodic heating and cooling said solution,
    evaporation of a high concentration the solution during heating with formation of a steam flows of the refrigerant and a weak solution of elevated temperature and pressure,
    using of the refrigerant steam flow in a heat engine with formation at a turbine exit of an exhaust steam of reduced temperature and pressure,
    decrease in temperature and pressure of the weak solution,
    absorption of the exhaust steam by the weak solution under cooling with formation of a strong solution,
    increase in pressure of the strong solution and feeding of the solution for evaporation,
    wherein
    the strong solution is divided into flows with increased concentration of the absorbent and flows with increased concentration of the refrigerant, whereas the flow with increased concentration of the absorbent being used as weak solution during absorption,
    while the flow with increased concentration of the refrigerant being employed during the evaporation as a high concentration solution after an additional increase in pressure and temperature.

2. The method as defined in claim 1 wherein the separation of the strong solution into the flows with various concentration is carried out by the strong solution filtration using semipermeable membranes.

3. The method as defined in claim 1 wherein the separation of the strong solution into the flows with various concentration is carried out by applying the centrifugal and gravitational effects.

4. The method as defined in claim 1 wherein the pressure of the refrigerant steam during the absorption rises due to the utilization of potential energy of the weak solution in a vapor-liquid ejector.

5. The method as defined in claim 1 wherein the high concentration solution delivered for evaporation is heated, whereas the weak solution being formed in the course of evaporation is cooled owing to a recuperative heat exchange between these flows.

6. The method as defined in claim 1 wherein for filtration of the strong solution the membranes with the selectivity no more than 0.75 are employed.

7. The method as defined in claim 2 wherein for filtration of the strong solution the membranes with the selectivity no more than 0.75 are employed.

8. The method as defined in claim 1 wherein the weak solution which has been formed during evaporation, after a decrease of its pressure and temperature, mixes with the high concentration solution being formed during filtration.

9. The method as defined in claim 1 wherein mixtures of the components differing in their capacity to permeability through a semipermeable membrane are applied as absorbent.

10. The method as defined in claim 1 wherein the exhaust steam before absorption is used for cooling external facilities.

11. A device for producing electric energy and cold comprising
   an absorber, a pump, a solution heat exchanger, a steam generator, a separator and a turbine with an electric generator, connected in closed cycle of solution motion, in which
the turbine connects at an inlet with the separator for delivering steam, and at an outlet from the turbine with the absorber,
   and the separator connects both to the steam generator and to the absorber with a thermoregulation valve,
   wherein
   filter elements have been mounted in a solution motion cycle between the absorber and the steam generator, said filter elements are connected on an one hand to the absorber with the possibility of delivery to the filter elements of the strong solution and return into the absorber of the weak solution, and on an other hand to the steam generator with the possibility of supply to the steam generator of a higher concentration solution passed by the filter elements.

12. The device as defined in claim 11 wherein the separator at the exit of weak solution is connected by means of a control valve and a supplementary expansion valve to the filter elements for entry into it of the weak solution.

13. The device as defined in claim 11 wherein after the filter elements a supplementary pump has been installed, and a recuperative solution heat exchanger has been mounted between the supplementary pump and the steam generator.

14. The device as defined in claim 11 wherein between the turbine and the absorber a vapor-liquid ejector has been installed.

15. The device as defined in claim 11 wherein as filter elements the membranes for Nano filtration are employed.

* * * * *